Figure 1:
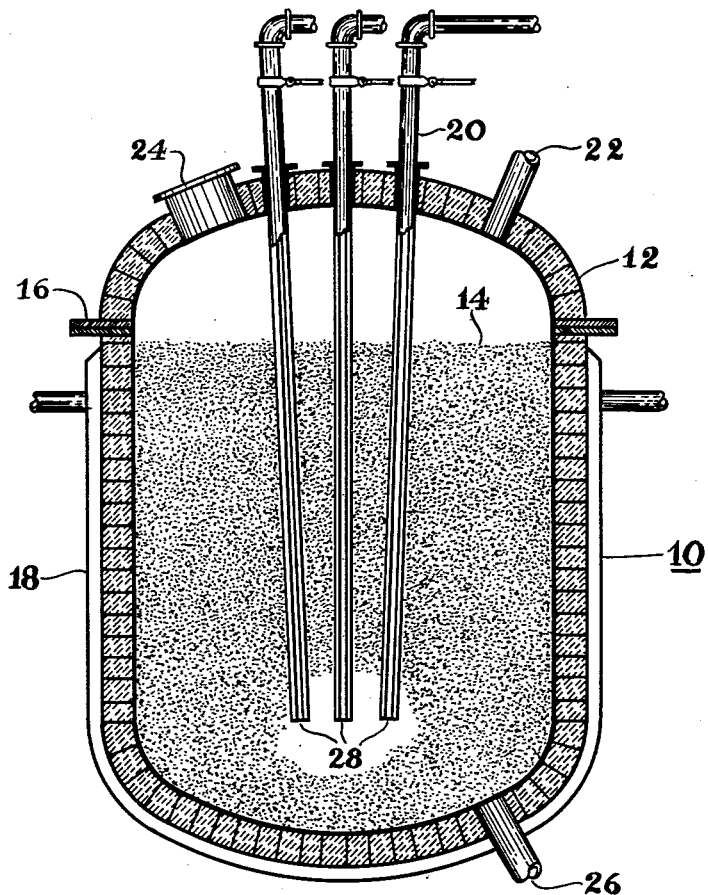

Nov. 28, 1961  R. N. SECORD  3,010,793
ELECTRIC FURNACE SILICON TETRACHLORIDE PROCESS
Filed Oct. 3, 1957

Inventor
R. N. Secord
By
Kenneth W. Brown, Atty 3,010,793
ELECTRIC FURNACE SILICON TETRACHLORIDE PROCESS
Robert N. Secord, Wenham, Mass., assignor to Cabot Corporation, Boston, Mass., a corporation of Delaware
Filed Oct. 3, 1957, Ser. No. 688,005
6 Claims. (Cl. 23—205)

This invention relates generally to a process and apparatus for effecting a reaction between a solid particulate material and a gas to produce a gaseous product, and has particular reference to a process and apparatus for the production of silicon tetrachloride.

Silicon tetrachloride is used in considerable quantities inter alia for the production, by flame hydrolysis thereof, of finely-divided silica suitable as a filler or a pigment in various compositions such as oils, waxes, and plastics.

Silicon tetrachloride has been produced by a number of methods. In the usual commercial process, chlorine is reacted with silicon metal or silicon carbide. The product so produced is unduly expensive because of the cost of the raw materials used and the process is carried out on a commercial scale with difficulty because of the large amount of heat generated by the reaction. Although an exothermic reaction is desirable from one point of view, in that no outside source of heat is necessary to maintain the reaction, the amount of heat liberated from the above mentioned reaction is so great as to cause severe erosion of the reactor lining, particularly in the presence of free chlorine.

It is known that silicon tetrachloride can be formed by passing chlorine through a bed composed of silica, in the form of sand, and carbon, maintained at an elevated temperature, above about 1200° C. Since the raw materials for this reaction are extremely cheap, it is attractive from an economic standpoint. However, because of certain practical difficulties, it has not heretofore been adapted for commercial use.

The principal difficulty with this reaction is the fact that it is endothermic, hence outside heat must be supplied continuously to maintain the reaction. Since the temperature at which the reaction proceeds requires that it be carried out in a refractory lined chamber, it is impractical to supply the necessary heat through the walls thereof, and even if the heat could be so supplied, the reaction would then take place most rapidly adjacent to the wall, the place where it is least desired.

It has also been found inconvenient to heat the chlorine gas to a temperature high enough to maintain the reaction temperature because of the corrosive nature of the gas. Other difficulties encountered in such processes are those of causing the feed gas to pass through the bed without blocking or channeling, and insuring that a high percentage of the feed gas reacts with the bed, rather than passing off in the product gas.

The principal object of this invention is to provide a process for producing silicon tetrachloride by means of an endothermic reaction at an elevated temperature which is carried out in such a manner that substantial erosion of the reactor wall is prevented.

A further object of the invention is to provide a process for producing silicon tetrachloride by passing chlorine through a bed of particulate material in a reaction chamber without permitting any substantial amount of chlorine to contact the reactor wall, and for insuring that substantially all the chlorine introduced reacts with the bed material.

A further object of the invention is to provide a process for carrying out an endothermic reaction between a gas and a particulate material, in which the external heat necessary for the reaction and the gas are introduced at substantially the same point in a bed of said particulate material.

A further object of the invention is to provide an apparatus for effecting an endothermic reaction between a gas and a particulate material, including means for supplying heat to the center of a bed of said particulate material and for introducing said gas at substantially the point of introduction of said heat.

Other objects of the invention will be apparent to one skilled in the art from the following description of a specific embodiment thereof.

Figure 2:
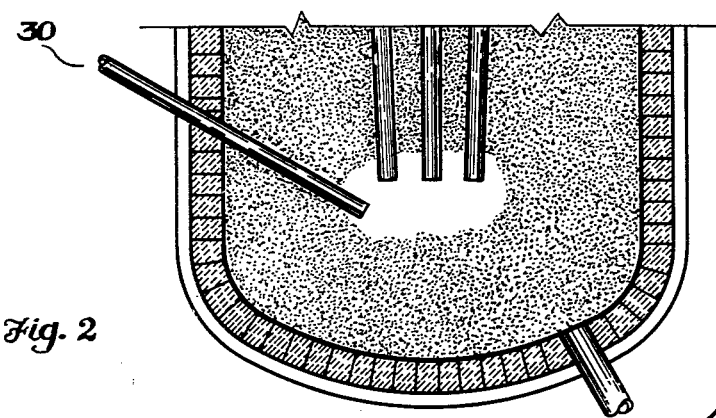

In the drawing:
FIG. 1 is a view in side elevation, partly in section, illustrating a reactor embodying the features of the invention;
FIG. 2 is a view in side elevation, partly in section, of a reactor similar to that of FIG. 1 having certain modifications within the scope of the invention.

Referring to FIG. 1, there is illustrated a reactor 10, which is particularly adapted for effecting an endothermic reaction between a particulate material and a gas.

The reactor 10 comprises generally a reactor shell 12 which is shaped to form a reaction chamber to receive a bed 14 of particulate material, and a removable cover 16 for closing the top of the reactor shell to enable the collection of the product gas. The shell 12 is internally lined with refractory material in the usual manner, and a cooling jacket 18 may be provided about the exterior of the shell, with means being provided for the circulation of cooling water therethrough.

The cover 16 may be also lined internally with refractory material, and said cover is suitably apertured to receive electrodes 20 for projecting downwardly into the bed material. The cover may also be provided with a product gas discharge aperture 22, and a feed aperture 24 for supplying the particulate material to the reaction chamber. To discharge molten unreacted bed material or impurities, a slag tap 26 is provided at the lower portion of the reactor shell.

The electrodes 20 are connected in the usual manner to a suitable source of current to enable the establishment of an arc in the reactor bed, as will be described hereinafter, and in the illustrated embodiment the electrodes are each provided with an axial passage 28, with means (not shown) provided externally of the reactor for supplying chlorine gas to the passages 28.

In operation, the reactor is charged with an intimate mixture of silica and carbon, with the ratio of silica to carbon being about 2½ to 1 by weight. The silica may be in the form of crushed quartz, silica sand, diatomaceous earth, or the like, and the carbon may be supplied by foundry coke, petroleum coke, carbon black, or the like.

The reaction may be started by energizing the electrodes to establish a current path between the ends thereof, thereby providing a zone of high temperature in the center of the bed. When the bed in this zone has reached a suitable temperature, preferably about 2000° F., chlorine may be injected through the center of the electrodes into the high temperature zone to react with the silica and carbon to form silicon tetrachloride generally in accordance with the equation.

$$SiO_2 + 2C + 2Cl_2 \rightarrow SiCl_4 + 2CO$$

The gaseous products pass upwardly through the bed and are removed from the reactor through the aperture 22, and the silicon tetrachloride may be separated by condensation in the usual manner. Since the ratio of silica to carbon in the reactor bed is in substantially stoichiometric proportions, the reaction may be operated continuously, with additional bed material being added periodically, and only unreacted impurities will be required to be removed from the slag tap.

Since the heat necessary to maintain the reaction is supplied in the center of the bed, the outer portion of the bed material serves to insulate the refractory lining from the temperatures occurring in the reaction zone. The fact that the chlorine is injected directly into the reaction zone, where an elevated temperature is maintained by the arc insures that substantially all of the chlorine will be reacted with the hot bed material, with substantially none of it passing off overhead, or coming into contact with the refractory wall.

Although in the preferred embodiment, the chlorine is injected through the center of one or more of the electrodes, it may in some cases be preferable to inject it into the reaction zone by means of a separate tube 30 protruding through the side wall of the reactor. (See FIG. 2.)

Although the electrodes are capable of supplying all the heat necessary to carry out the reaction, in some cases it may be desirable to include a percentage of silicon carbide or silicon metal in the bed, to supply a portion of the heat, since the reaction between silicon carbide (or silicon metal) and chlorine to produce silicon tetrachloride is highly exothermic. However, it is preferred to not use sufficient silicon carbide to make the reaction self sustaining, since in such case the reaction could possibly spread to the reactor wall, which is undesirable because of the resultant wall erosion.

Example

A reactor having a diameter of 30 inches and a length of 45 inches, having a reaction chamber of about 27 cubic feet, is charged with 1000 lbs. of ½ inch to 40 mesh crushed quartz, and 400 lbs. of calcined petroleum coke of the same screen fraction, intimately intermingled. Three 2 inch diameter electrodes extending into the bed are energized with 110 v. three phase current, at about 2000 amperes. $SiCl_4$ is produced at a rate of about 220 lbs./hour. New charge is added at a rate of 80 lbs. of $SiO_2$ and 31 lbs. of carbon per hour. About 60 lbs. of slag is removed each 24 hours, consisting principally of unreacted $SiO_2$. The off gas is cooled and the $SiCl_4$ is condensed at $-65°$ F.

Although the illustrated embodiment of the device is particularly adapted for use in the manufacture of silicon tetrachloride, the principles of the invention are adaptable for use in any endothermic process in which a gas is reacted with a solid particulate material.

Since certain obvious changes may be made in the device without departing from the scope of the invention, it is intended that all matter contained herein be interpreted in an illustrative and not in a limiting sense.

Having thus described my invention, I claim:

1. A process for producing silicon tetrachloride from a mixture of silica and carbon maintained as a bed in which silica is the major component thereof and a gas containing free chlorine, comprising the steps of establishing by means of an electric arc a high temperature reaction zone in the medial portion of said bed the outer limits of said zone being substantially removed from the outer limits of said bed and injecting said gas directly into said zone without allowing said gas to come into previous contact with the portion of the bed surrounding said reaction zone thereby producing silicon tetrachloride in vapor form, and recovering the silicon tetrachloride from said zone.

2. The process of claim 1 wherein the electric arc is generated by means of hollow electrodes the arc-forming ends of which extend into said medial position of the bed and the free-chlorine containing gas is introduced through the inside of said hollow electrodes.

3. In a process for producing silicon tetrachloride by the chlorination of a porous bed of intimately admixed silica and carbon maintained in approximately stoichiometric proportions, the improvement which comprises heating by means of localized electric arcs only a centralized zone within said bed to the temperatures required for active chlorination of such admixtures of silica and carbon and directly injecting exclusively and solely into said centralized zone gases containing free chlorine, thereby causing substantially all of said chlorine to react within said centralized zone, thus minimizing waste of chlorine and attack by chlorine on other materials.

4. The improvement as described in claim 3 in which the localized electric arcs are generated between the extended ends of hollow electrodes, and the gases containing free chlorine are fed into the centralized zone through the inside of said hollow electrodes.

5. A continuous process for producing silicon tetrachloride from an intimate admixture of silica and carbon, maintained roughly in proportions by weight of about 2.5 to 1 comprising forming a bed of such silica-carbon admixture within a refractory walled container, having a plurality of electrodes located so that they extend into said bed with their lower ends in close proximity to one another and remote from said refractory walls, energizing said electrodes so as to cause electric arcs to pass between the lower ends of same thereby heating a localized internal portion of said bed to a much higher temperature than peripheral portions of the bed, continuously introducing gaseous chlorine directly into said localized, high temperature internal portion of said bed, withdrawing vaporous silicon tetrachloride from said bed as formed, and adding additional amounts of admixed silicon and carbon to the top of the bed as needed.

6. A continuous process as in claim 5 in which the said electrodes are hollow and the gaseous chlorine is introduced directly into said localized, high temperature internal zone through the inside of said hollow electrodes.

References Cited in the file of this patent

UNITED STATES PATENTS

| | | |
|---|---|---|
| 430,453 | Willson | June 17, 1890 |
| 1,312,800 | Moore et al. | Aug. 12, 1919 |
| 2,657,118 | Phillips et al. | Oct. 27, 1953 |
| 2,777,756 | Anazawa et al. | Jan. 15, 1957 |

OTHER REFERENCES

Thomson and Bloxam: "Chemistry Inorganic and Organic," 9th ed., rewritten and revised, 1903, pages 282–283.